US006709265B2

(12) United States Patent
Guzman

(10) Patent No.: US 6,709,265 B2
(45) Date of Patent: Mar. 23, 2004

(54) METHOD FOR MAKING A NOVELTY CANDLE

(75) Inventor: Crystalyn Denise Guzman, 19043 Bessemer St., Reseda, CA (US) 91335

(73) Assignee: Crystalyn Denise Guzman, Reseda, CA (US)

( * ) Notice: Subject to any disclaimer, the term of this patent is extended or adjusted under 35 U.S.C. 154(b) by 57 days.

(21) Appl. No.: 10/191,463

(22) Filed: Jul. 10, 2002

(65) Prior Publication Data

US 2003/0008256 A1 Jan. 9, 2003

Related U.S. Application Data

(62) Division of application No. 29/143,593, filed on Jun. 16, 2001, now Pat. No. Des. 472,334.

(51) Int. Cl.[7] ............................ F23D 3/16; B29B 13/00

(52) U.S. Cl. .................... 431/289; 431/126; 264/271.1; 264/247

(58) Field of Search ................................ 431/288, 289, 431/291, 325, 126; 362/161; 44/275; 264/271.1, 275, 247; 425/803

(56) References Cited

U.S. PATENT DOCUMENTS

| | | | | |
|---|---|---|---|---|
| D246,010 S | * 10/1977 | Tanikawa | .................... | D26/7 |
| 5,632,615 A | * 5/1997 | DeGarmo | .................. | 431/288 |
| 5,693,277 A | * 12/1997 | Widmer | .................. | 264/271.1 |

FOREIGN PATENT DOCUMENTS

| | | |
|---|---|---|
| JP | 9-25494 A | * 1/1997 |

OTHER PUBLICATIONS

Guy, Gary V. "Easy–To–Make Candles". New York: Dover Publications, 1979. p. 5.*

Monroe, Ruth. "Kitchen Candlecrafting". New Jersey: A.S. Barnes, 1970. p. 31.*

Constable, David. "Candlemaking". Great Britain: Search Press, 1992. p. 52.*

Lawson, Darl. "Candle By Design". Illinois: Grace Publications, 2001. p. 9.*

"Designer Candle Art" by Candle Creations. Date unknown. pp. 3 and 4.*

* cited by examiner

*Primary Examiner*—Josiah Cocks

(57) ABSTRACT

A novelty candle having a flat top side, a flat back side, a flat left side, a flat right side, a flat bottom side and a face side in which is embedded a plurality of defined shapes located on and protruding from the face side of the candle. The method has the steps of pouring a liquid wax of about 150 to 190 degrees Fahrenheit into a mold; cooling said wax to a temperature of about 70 to 90 degrees Fahrenheit to form a wax base; inserting preformed wax alphabet letters, numbers and/or shapes onto said wax base; pouring a thin layer of wax onto the wax base in order to adhere the wax base and preformed wax letters numbers and/or shapes securely to one another; drilling holes into the wax and placing wick into these holes to form a working candle which reads a specified name, word or phrase.

1 Claim, 2 Drawing Sheets

METHOD FOR MAKING A NOVELTY CANDLE

This is a division of application Ser. No. 29/143,593 filed Jun. 16, 2001 now U.S. Pat. No. D472,334.

BACKGROUND—Field of Invention

This invention relates to the field of candles, specifically to a novelty candle in which preformed wax letters of varying color are arranged into a wax base of varying color and scent in order to spell certain names and words, hence offering a much needed personalized product to the market.

SUMMARY OF THE INVENTION

The present invention provides a method for making a personalized name novelty candle, comprising a solid wax base of one color and scent in which are embedded preformed wax letters in a specific order to read a certain name or word.

OBJECTS AND ADVANTAGES

Though candles have been around for centuries, they continue to be one of the best selling gift items in today's market. We intend to combine this love of candles and to solve the need for personalized products for persons with unique, different or ethnic first or last names. Never before have the two been commercially available as one personalized product.

In today's market, the only available personalized products, such as coffee mugs, magnets, key chains and necklaces have a very limited amount of stock names available for sale. With the melting pot that America is, there is an abundance of people that are not able to find the personalized products which they desire. Our invention offers them a solution. People can custom order this candle with any combination of letters, scent and colors so desired. The letters inserted into the wax candle base to form words will be first names, last names and any other combination of letters, numbers or preformed designed wax characters such as hearts, butterflies, etc. so desired by the consumer. This will allow us to change and altar the invention according to new trends and customer needs while remaining within the scope of the invention.

Figure 1:
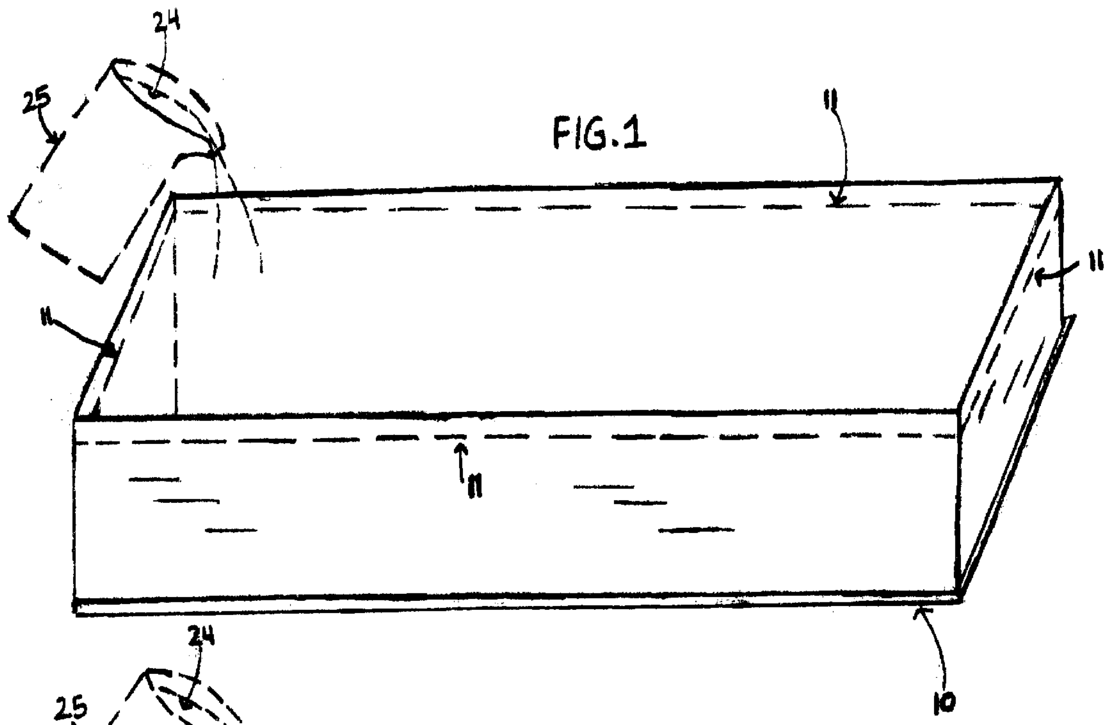
FIG. 1 illustrates a perspective view of the candle while in its mold, demonstrating the steps of pouring the wax base, allowing said wax to cool to about 80 to 100 degrees Fahrenheit.

| | | | |
|---|---|---|---|
| 10 | mold | 21 | back side |
| 11 | fill line | 22 | left side |
| 12 | wax character | 23 | bottom side |
| 13 | wax number | 24 | liquid wax |
| 14 | thru 16 wax letters | 25 | vessel |
| 17 | wax base | 26 | wick |
| 18 | face side | 27 | wick hole |
| 19 | right side | 28 | thru 32 wax letters |
| 20 | top side | | |

DETAILED DESCRIPTION OF THE DRAWINGS

The present invention provides a candle having a flat bottom side 23, a flat right side 19, a flat top side 20, a flat back side 21, a flat left side 22 and a face side 18 in which are embedded a plurality of preformed wax characters, (12 represents one type of character,) numbers, (13 represents one of ten numbers,) and alphabet letters, (14 thru 16 and 28 thru 32 represent some of the 26 alphabet letters.) All preformed wax characters, numbers and letters can be of any color.

The method of the present invention begins with FIG. 1, which demonstrates pouring liquid wax 24 of about 150–190 degrees Fahrenheit that has been blended with dyes and scented oils to be any color or scent so desired from a vessel 25 into a mold 10 having an interior defined by flat sides. The wax is poured up to the fill line 11, (about one quarter to one half inch under the top of mold 10,) and allowed to cool to about 80 to 100 degrees Fahrenheit.

Said liquid wax 24 in vessel 25 is then set aside and kept at a temperature of about 150 to 190 degrees Fahrenheit by a heat source, (not shown,) such as a wax tank or other electric heating element.

Figure 2:
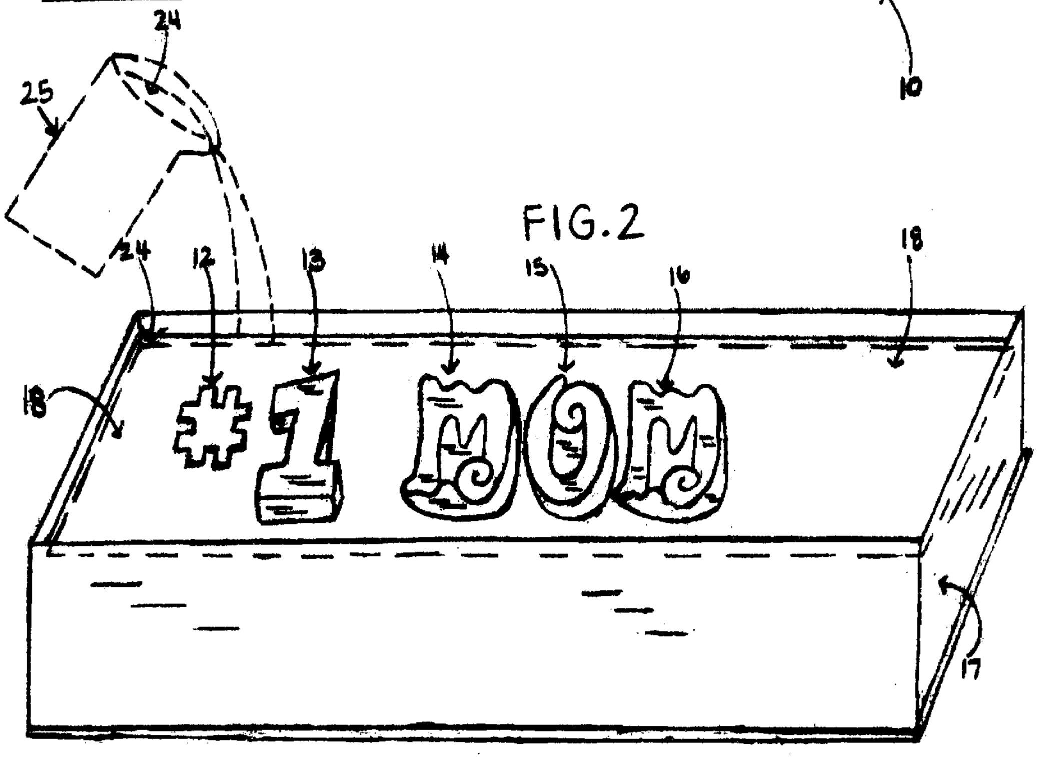
FIG. 2 illustrates a perspective view of a further step of this invention. The steps include placing a plurality of preformed wax characters, alphabet letters and/or numbers onto said cooled wax base, pouring a top layer of wax and allowing to cool to about 80 to 100 degrees Fahrenheit.

In FIG. 2, a plurality of preformed wax letters 14 thru 16, numbers 13 and characters 12 are placed onto cooled wax base 17 and arranged to read a specified phrase or to spell out a desired name or word. In this figure, the characters 12, numbers 13 and letters 14 thru 16 are arranged to read the phrase "#1 mom". A one half inch layer of liquid wax 24 is poured from vessel 25 onto cooled wax base 17 and around all placed wax characters 12, numbers 13 or alphabet letters 14 thru 16 so as to completely cover wax base 17 and once cooled completely adhere wax characters 12, numbers 13 and/or alphabet letters 14 thru 16 to wax base 17. Said wax characters 12, numbers 13 and/or alphabet letters 14 thru 16 are protruding from face side 18 about one half inch to one and one half inches so as to provide a three dimensional effect. Entirety is allowed to cool to about 70 to 90 degrees Fahrenheit.

Figure 3:
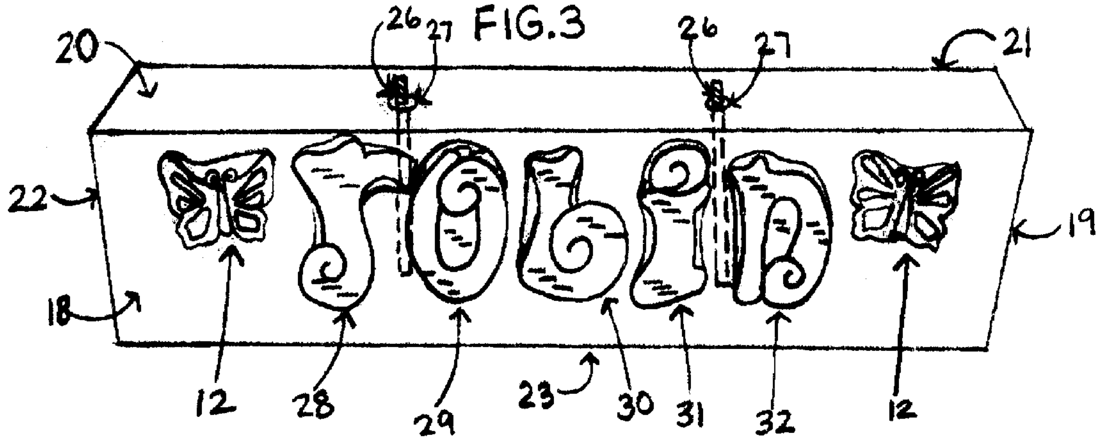
FIG. 3 is a front perspective view of candle that has been removed from said mold and placed on its bottom side on a surface. Wicks are inserted into top side of candle.

In FIG. 3, the entirety composed of wax is shown in a front perspective view, has been removed from mold 10 and henceforth shall be referred to as a candle. Said candle is placed on its bottom side 23 on a flat surface 33. Two holes 27 are formed by using a motorized drill, (not shown,) and drilling from top side 20 of candle about 3 to 4 inches from left side 22 and right side 19 respectively and about 1 inch from face side 18 to back side 21 downward about 2 inches into wax base 17. Two and one quarter inch pieces of wax covered cotton wick 26 are placed into each of the wick holes 27. The face side 18 reads the name "robin".

It should be understood by those skilled in the art that various changes and modifications can be made to the candle by introducing new characters and fonts of numbers and alphabet letters. Such changes and modifications may be made without departing from the scope of the present invention, as they will only enhance the objects and advantages of a truly unique and personalized product.

I claim:

1. A method of making a novelty candle having incorporated a plurality of preformed wax alphabet letters, numbers and other shapes, the method comprising the steps of:

pouring a liquid wax at a temperature of about 150 to 190 degrees Fahrenheit up to one half inch under the top opening of a mold having an interior defined by flat sides to form a wax base;

cooling said wax base to about 80 to 100 degrees Fahrenheit;

arranging a plurality of wax alphabet letters, numbers, and/or characters onto said cooled wax base;

pouring a thin layer of liquid wax at a temperature of about 150 to 190 degrees Fahrenheit onto the wax base such that said liquid wax completely covers said wax base and completely surrounds a bottom portion of said letters, numbers and/or characters such that said letters, numbers and/or characters protrude from one side of said wax base;

cooling entirety to a temperature of about 70 to 90 degrees Fahrenheit;

removing entirety from said mold;

placing entirety onto a flat surface wherein the bottom side of the wax piece is flat against said surface;

drilling two 2 inch holes downward into wax base and placing a wax covered cotton wick into each of the holes to form a working candle.

* * * * *